(12) United States Patent
El Din et al.

(10) Patent No.: US 12,500,634 B2
(45) Date of Patent: Dec. 16, 2025

(54) SPATIAL-WIDEBAND COMPENSATION IN WIDEBAND MASSIVE MIMO SYSTEMS

(71) Applicant: ISTANBUL MEDIPOL UNIVERSITESI TEKNOLOJI TRANSFER OFISI ANONIM SIRKETI, Istanbul (TR)

(72) Inventors: Liza Afeef Omar Shebab El Din, Istanbul (TR); Abu Bakari Kihero, Istanbul (TR); Hüseyin Arslan, Istanbul (TR)

( * ) Notice: Subject to any disclaimer, the term of this patent is extended or adjusted under 35 U.S.C. 154(b) by 0 days.

(21) Appl. No.: 18/718,311

(22) PCT Filed: Dec. 7, 2022

(86) PCT No.: PCT/TR2022/051439
§ 371 (c)(1),
(2) Date: Jun. 10, 2024

(87) PCT Pub. No.: WO2023/107076
PCT Pub. Date: Jun. 15, 2023

(65) Prior Publication Data
US 2025/0055511 A1 Feb. 13, 2025

(30) Foreign Application Priority Data
Dec. 9, 2021 (TR) ................ 2021/019477

(51) Int. Cl.
*H04K 1/10* (2006.01)
*H04B 7/0456* (2017.01)
(Continued)

(52) U.S. Cl.
CPC ......... *H04B 7/0456* (2013.01); *H04B 7/0617* (2013.01)

(58) Field of Classification Search
CPC .. H04B 7/0456; H04B 7/0617; H04B 1/0028; H04B 10/25752; H01Q 3/28; H04J 11/0033
(Continued)

(56) References Cited

U.S. PATENT DOCUMENTS 10,218,550 B1 * 2/2019 Kim ................ H04B 1/0028
10,714,836 B1    7/2020 Karabacak
(Continued)

FOREIGN PATENT DOCUMENTS

WO    2021134366 A1    7/2021

OTHER PUBLICATIONS

International Search Report for corresponding PCT/TR2022/051439 dated Apr. 4, 2023.
(Continued)

*Primary Examiner* — Phuong Phu
(74) *Attorney, Agent, or Firm* — Egbert, McDaniel & Swartz, PLLC

(57) ABSTRACT

This invention provides a novel transceiver design to control/compensate for the spatial-wideband effect in wideband massive multiple-input multiple-output (MIMO) systems for both sensing and communication networks. The proposed design aims to divide the ultra-wideband signal into narrow band beams and control them with a simplified exhaustive search-based precoding to align the beam angle to the target direction.

3 Claims, 2 Drawing Sheets

(51) Int. Cl.
*H04B 7/06* (2006.01)
*H04L 27/28* (2006.01)

(58) Field of Classification Search
USPC .................................. 375/260, 267, 299, 347
See application file for complete search history.

(56) References Cited

U.S. PATENT DOCUMENTS

| | | | |
|---|---|---|---|
| 2016/0182136 A1* | 6/2016 | Zhang .................. | H04J 11/0033 |
| | | | 370/329 |
| 2017/0317710 A1 | 11/2017 | Liu et al. | |
| 2019/0181926 A1 | 6/2019 | Liang | |
| 2020/0014429 A1 | 1/2020 | Leung | |
| 2020/0243981 A1* | 7/2020 | Karabacak ........... | H04B 7/0617 |
| 2021/0351507 A1 | 11/2021 | Gorbachov | |
| 2021/0384976 A1* | 12/2021 | Torfs ................ | H04B 10/25752 |
| 2021/0391904 A1* | 12/2021 | Jam .......................... | H01Q 3/28 |

OTHER PUBLICATIONS

Written Opinion of the International Searching Authority for corresponding PCT/TR2022/051439 dated Apr. 4, 2023.

* cited by examiner

SPATIAL-WIDEBAND COMPENSATION IN WIDEBAND MASSIVE MIMO SYSTEMS

TECHNICAL FIELD

This invention provides a novel transceiver design to control/compensate for the spatial-wideband effect [1] in wideband massive multiple-input multiple-output (MIMO) systems for both sensing and communication networks.

In other words, the invention is a novel transceiver design for MIMO systems in sensing and/or communication networks to overcome one of the multiple antenna issues called spatial-wideband effect in wireless communication systems.

PRIOR ART

The next generation cellular systems are envisioned to achieve better performance (e.g., higher data rate, better energy efficiency, and higher reliability) than current generation systems. To achieve this target, several emerging techniques such as massive MIMO, ultra-wideband transmission, and millimeter-wave (mmWave) communication are developed. Massive MIMO can improve spectrum and energy efficiency, combat small-scale fading through channel hardening, and extend network coverage by overcoming the physical-layer problem. Ultra-wideband transmission not only facilitates high data rate communication but also provides resilience against multipath fading and covertness against jamming attacks. The advantages of both massive MIMO and ultra-wideband also span to the radio-frequency (RF) sensing aspect of the wireless networks that have been recently considered under the joint radar and communication framework. They, respectively, provide fine spatial and temporal multipath resolution, thereby facilitating accurate localization and ranging of the target objects. A large amount of available frequency spectrum and small wavelength at mmWave makes massive MIMO and ultra-wideband feasible for practical wireless networks. However, with a huge number of antenna elements packed in the antenna array, a non-negligible time delay for the data symbol between the first received antenna element and the last one is produced leading to what it called the spatial-wideband effect (Wang, B. et al., 2018). According to the Huygens-Fresnel wave propagation principle, in the antenna array systems, unless the incident signal is perpendicular to the array, the received signal at different array elements is a slightly delayed version of the original signal. The amount of delay incurred across the elements depends on the inter-element spacing and the signal's angle-of-arrival (AoA). For a system with a relatively small number of antennas, as it is in the conventional small-scale MIMO systems, the maximum delay across the antenna aperture can be much smaller than the symbol duration and thus its effect can be ignored. However, with high-dimensional antenna arrays, i.e., massive MIMO, with ultra-wideband signaling, this delay can be in the order or even larger than the symbol duration, leading to the so-called delay squinting effect in the spatial-delay domain, i.e., multipath delay spread even in the pure line-of-sight channel is observed. The delay squinting problem renders the arrays steering vector frequency-dependent in the angular-frequency domain. That is, in multicarrier systems like orthogonal frequency division multiplexing (OFDM), signals at different subcarriers will point to different physical directions. Signals pertained to such derailed subcarriers might not arrive at the intended receiver or align with sidelobes or nulls of the receiver's radiation pattern, thereby degrading the performance. This also can be called beam squint effect. The beam squint effect causes an angle shift in the beam resulting in reducing the capacity of the system.

Currently there are only a few methods in solving the spatial-wideband issue. The work in (Liu, Z. et al., 2013) is considered as the first study to tackle with spatial-wideband effect in mmWave communication systems, where a phase improvement scheme is proposed for different sub-bands to reduce the effect of spatial-wideband in beamforming codebook. However, the high implementation cost of additional phase shifters and bandpass filters makes the solution not feasible for practical implementation. The work in (Cai, M. et al., 2016) develops a codebook design algorithm where the number of beams is increased to guarantee the minimum beam gain of all subcarriers. However, the size of the codebook is increased rapidly as the number of antenna elements increases which leads to long beamforming times and hence introducing latency. Therefore, another publication (Yu, H. et al., 2021) proposes a fixed-size codebook design that optimizes the beam pattern and spreads its coverage without considering the hardware design complexity.

The work in another paper (Liu, X. et al. 2018) designs a beam pattern to maximize the average beam gain within the required bandwidth while the overall beam gain is decreased, and an accurate channel estimation is needed to achieve the optimum design and compensate for spatial-wideband effect. Therefore, the publication by Li, G (Li, G., et al. 2018) proposes a hybrid precoder that compensates for the spatial-wideband effect in the digital domain. This method is basically an improvement to a digital precoder considering the frequency-dependent analog precoder for each subcarrier. However, the spatial-wideband effect compensation in the digital domain results in restricted array gain and spectral efficiency improvements. This is due to that the spatial-wideband issue is related to the analog nature of wideband signals.

According to that, in another paper by Liu, B. (Liu, B. et. al. 2018), a two-tier hybrid beamforming is proposed. The first tier adopted Rotman lens as an analog precoder to provide true-time delay and reduce the spatial-wideband effect, while block diagonalization precoder is proposed for the digital precoder part to cancel inter-user interference. The second-tier precoder is proposed to collect the leak power problem that is introduced in a practical lens array. However, due to the simple realization structure of the Rotman lens, it is hard to achieve an optimal geometrical shape that reduces the path length error and serves a large/massive number of antenna elements. Furthermore, the work in another publication (Sattar, Z., et al, 2019) proposes an analog architecture design to mitigate the impact of the spatial-wideband effect. The design is based on dividing the wideband signal into chunks of comparatively narrowband signals using a bank of bandpass filters, followed by an additional phase shift network. However, the proposed design brought complexity overhead to a massive MIMO system design.

The disadvantages of the previously proposed techniques can be summarized as follows:
  In designing a codebook to compensate for the spatial-wideband effect, the size of the codebook is increased rapidly as the number of antenna elements increases which leads to long beamforming times and hence introducing latency. Additionally, the hardware design complexity needs to be taken into consideration while designing the codebook.
  Since the spatial-wideband issue is related to the analog nature of wideband signals, any compensation in the digital domain using digital precoder results in restricted array gain and spectral efficiency improvements.

An enhanced analog scheme to compensate the spatial-wideband effect causes high implementation cost due to additional phase shifters and bandpass filters especially in massive MIMO systems which make the solution not feasible for practical implementation.

An enhanced analog scheme that uses the Rotman lens suffers from design limitations due to the simple realization structure of the Rotman lens which makes it hard to achieve an optimal geometrical shape that reduces the path length error and serves a large/massive number of antenna elements.

Therefore, when the status of the prior art is taken into consideration, it is evident that there is a need in the art for a method to solve the spatial-wideband issue observed in the next-generation or specifically 5G systems.

AIMS OF THE INVENTION AND BRIEF DESCRIPTION

The present invention is related to a novel transceiver design method in order to control and/or compensate for the spatial wide-band effect in massive multiple-input multiple-output (MIMO) systems for both sensing and communication networks.

The proposed transceiver design and the method thereof, provides a spectrum-efficient communication system based on the lens antenna subarray concept while achieving less hardware complexity than the conventional massive MIMO systems. In particular, the proposed design aims to provide the following solutions:

- Compensates the beam squint issue caused by the time delay in the symbol duration across the antenna array in wideband massive MIMO systems. The beam squinting leads to deviation in the transmitted beam from its target direction and this causes a significant performance loss in system capacity. Therefore, by solving this problem, the system capacity is significantly improved.
- Unlike the existing solutions that relies on the usage of extra phase shifters, our proposed design has less hardware complexity as it employs cheaper (in terms of cost and/or power consumption) hardware components like analog filters, switches, and lenses. As such, our invention provides a solution that creates a good balance between hardware complexity, energy efficiency, and cost.
- Due to the low-cost and energy efficiency nature of the proposed design, it has a broad impact to the wireless networks in terms of affordability and also facilitates the accomplishment of the envisioned green-communication networks.

DETAILED DESCRIPTION OF THE INVENTION

Figure 1:
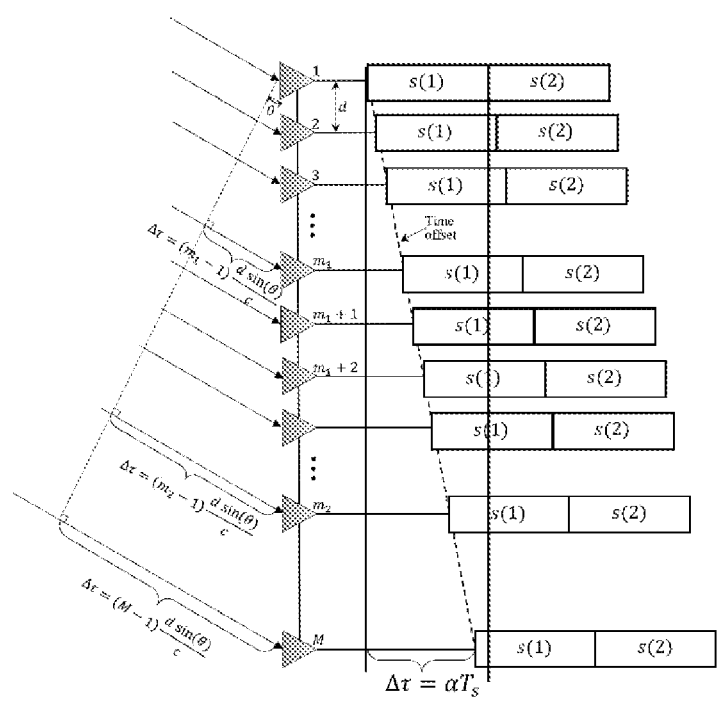
FIG. 1: Illustration of spatial-wideband effect in massive MIMO system
- θ: the direction of the received data stream at the first antenna element
- d: the distance between two adjacent antenna elements
- c: speed of light
- $T_s$: Symbol duration
- s(1): first transmitted symbol that received at the multiple antenna receiver
- s(2): second transmitted symbol that received at the multiple antenna receiver
- Δτ: time delay between the given antenna with respect to the first antenna element
- $m_1$: antenna index #1
- $m_2$: antenna index #2
- M: Number of antenna elements
- α: maximum time delay ratio between the first antenna element and the last one.

As mentioned above, the present invention is related to a novel transceiver design method to control and/or compensate for the spatial wide-band effect in wideband massive multiple-input multiple-output (MIMO) systems for both sensing and communication networks The Huygens-Fresnel wave propagation principle dictates that, in the antenna array systems, unless the incident signal is perpendicular to the array, the received signal at different array elements is a slightly delayed version of the original signal. The amount of delay incurred across the elements depends on the inter-element spacing and the signal's arrival angle. For a system with a relatively small number of antennas, as it is in the conventional small-scale MIMO systems, the maximum delay across the antenna aperture can be much smaller than the symbol duration and thus its effect can be ignored. However, with high-dimensional antenna arrays, i.e., massive MIMO, with ultra wide-band signaling, this delay can be in the order or even larger than the symbol duration, leading to the so-called delay squinting effect in the spatial-delay domain, i.e., multipath delay spread even in the pure line of sight channel is observed. The delay squinting problem renders the arrays steering vector frequency-dependent in the angular-frequency domain. That is, in multicarrier systems, signals at different subcarriers will point to different physical directions. Signals pertained to such derailed subcarriers might not arrive at the intended receiver or align with sidelobes or nulls of the receiver's radiation pattern, thereby degrading the performance. Hence, this phenomenon is referred to as spatial wide-band, and can be also called beam squinting.

An exhaustive search precoding technique and simplified one is used to control the novel design method according to present invention.

The transceiver design method of the invention can also be used in any wireless sensing and/or communication networks with MIMO technology. The transceiver design method of the invention provides energy and spectrum efficient systems with less hardware complexity compared to conventional massive MIMO systems.

Standards like 3GPP-based cellular and IEEE 802.11 based Wi-Fi networks, or any wireless network are particularly relevant to the invention due to the support of multiple antenna technology provided in both standards.

Furthermore, the described method in this invention can be implemented on any device, system or network capable of supporting any of the aforementioned standards, for instance: Long Term Evolution (LTE), LTE-advanced, AMPS, 5G New Radio (NR).

When the advantages provided by the design and the method thereof is considered it is seen that;

- The proposed design provides a spectrum-efficient MIMO system to compensate for the spatial-wideband effect without loss in beam gain as in the traditional codebook designs.
- Compared to the previous exiting spatial-wideband solutions, the proposed design provides an efficient solution for the spatial-wideband effect that takes into account both hardware and precoder design without a notable decreasing in system performance.
- Unlike the existing solutions that relies on the usage of extra phase shifters, our proposed design has less hardware complexity as it employs cheaper (in terms of cost and/or power consumption) hardware components like analog filters, switches, and lenses. As such, our invention provides a solution that creates a good balance between hardware complexity, energy efficiency, and cost.
- Due to the low-cost and energy efficiency nature of the proposed design, it has a broad impact to the wireless networks in terms of affordability and also facilitates the accomplishment of the envisioned green-communication networks.
- The proposed design with a careful precoding technique can serve either single user or multiple users within one physical beam depend on the allocated subcarrier frequencies by controlling the beam deviation.
- The enclosed design is applicable to single user, multiuser, centralized, and distributed MIMO systems.

In one aspect, present invention relates to a method to build and control a novel transceiver wherein said method comprises the steps of:

Designing a conventional LAS massive MIMO system

Adding L Analog subband filters to each lens after the phase shifter component to divide the ultra-wideband signal into chunks of narrowband signals, Replacing SPMT switching network in the conventional LAS design with a MPMT switching network to connect the output of the L filters to L out of P antenna elements on each lens, Providing a conventional exhaustive search for the precoding design to control the proposed transceiver design, Adding a certain linear threshold is to the exhaustive search to perform faster and to reduce the complexity overhead of the conventional exhaustive search on the precoding design.

In another aspect, present invention relates to a novel transceiver wherein; said transceiver comprises a conventional LAS massive MIMO system where $N_L$ phase shifters (PSs) connect to L subband analog filters for each phase shifter (PS) and a multiple pole multiple throw (MPMT) switching network to connect the output of the L filters to L out of P antenna elements in each lens replaces SPMT switching in the conventional LAS massive MIMO system network.

Herein $N_L$ is the number of PSs in the design, in other words it is the number of lenses in the design.

Herein L is the number of analog subband filters in the design and P is the number of antenna elements under each lens (where P is always > or = (greater than or equal to) L). In this method, parameter L is chosen carefully to provide a signal from each analog subband filter that has symbol duration larger than the original one where the time delay between the first antenna element and the last one can be negligible for this new signal. Furthermore, parameters P and $N_L$ compared to available fix number of antenna elements M are chosen to provide maximum controlling of the design when the precoding technique is applied. Therefore, the beam squint can be compensated and/or controlled.

In another aspect, present invention relates to a method for grouping the subcarrier frequencies into L subgroups where the bandwidth of these subgroups is much less than the total bandwidth of the signal (in other words a method for dividing ultra-wideband signal into chunks of narrowband signals, which can also be called as sub-beams), wherein said method comprises the steps of;

Assuming that the number of antenna elements under each lens P should be equal to or larger than the number of subgroups (P≥L) to increase the angular resolution of each lens and provide better controlling for each narrowband signals when a precoding technique is applied.

Using a frequency dependent analog precoder given as;

$$F = F'_{LAS}(k')F_{PS},$$

where $F'_{LAS}$ is the selection matrix for the proposed LAS design, k'=1, 2, . . . , L.

Activating multiple antenna elements within one column in the $S_t^{(i)}$ matrix, wherein the activating element is;

$$s_t^{(i)}(p) = \begin{cases} 1, & \min_p(|\Delta\phi|) \\ 0, & \text{otherwise} \end{cases},$$

where $\Delta\phi$ is the main lobe angle difference between the ideal beam and the squinted beam Applying a simplified exhaustive search to reduce the complexity overhead where a specific threshold is put to stop the search when the $\Delta\phi$ is less or equal to the threshold, herein the condition of activating the elements in $S_t^{(i)}$ given as $$|\Delta\phi| \leq \zeta(k')$$

Where $\zeta(k')$ is the threshold which is a function of the subband filter indices.

In the above method, replacing SPMT switching network in the conventional LAS design with a MPMT switching network enables each lens to provide L sub-beams at a time launched to different direction.

In the above method, the term "a certain linear threshold" means that the linear threshold function is not fixed, depending on the given system design. it is chosen in a way that reduces the complexity overhead of precoding design while achieving near-optimal beam gain over all frequency ranges.

For a massive MIMO system with a wideband transmission, FIG. 1 shows the spatial-wideband effect in a large antenna array has M antenna elements. In the figure, θ refers to the direction of the received data stream at the first antenna element, d is the distance between two adjacent antenna elements, c is the speed of light, $T_s$ is the symbol duration, s(1) and s(2) are the first and second transmitted symbols that received at the multiple antenna receiver, and Δτ is the time delay between the given antenna with respect to the first antenna element. If the maximum time delay is comparable to the symbol duration $T_s$ or even larger, then the last antenna element would see a different transmission symbol from the first antenna element. This leads to a shift in beam direction for the frequency's indices far from the operating frequency. This phenomenon is also known as beam squint effect. In general, a massive MIMO system with Δτ comparable to or larger than 0.1 $T_s$, the beam squint effect is evident and should be properly treated, specifically, in the case of channel estimation, user scheduling, inter-antenna synchronization, analog beamforming/combining design, and sidelobe controlling [2].

Massive MIMO systems depend upon a large number of antennas to reduce the effect of noise, fading, and interference. However, utilizing a large number of antennas increases the system complexity and hardware cost due to increasing in analog radio-frequency (RF) components, specifically, phase shifters (PS)s. To deploy massive MIMO, low-cost and small components are needed to reduce the computational complexity and hardware size. Therefore, alternative architectures are introduced by employing single-lens or multiple lenses to the antenna array design which replacing the PSs network with less power demanding RF switches. Employing a lens antenna array enables the use of beam selection without notable performance degradation. However, the beam selection network is frequency-independent while the wideband channel, as demonstrated before, is frequency-dependent due to the beam squint phenomena. Therefore, a lens antenna subarray (LAS) design [3] with an appropriate precoder can be a promising technology to support multiple focused-energy beams and compensate for the power leakage problem by capturing most of the channel energy over the total bandwidth within one RF chain/path while taking into account the beam squint effect. In order to explain the proposed design and its functionality, the conventional LAS design is first introduced here.

Figure 2:
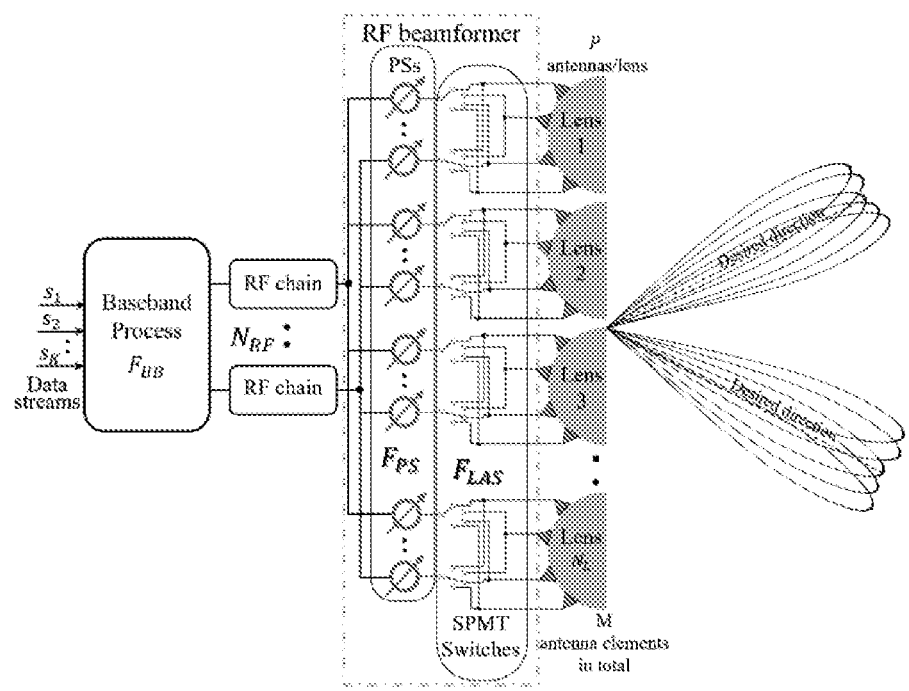
FIG. 2: The conventional LAS-MIMO system design
- $s_1$: first bit in data stream
- $s_2$: second bit in data stream
- $F_{BB}$: Baseband precoding matrix
- $N_{RF}$: Number of radio-frequency (RF) chains.
- RF: Radio frequency
- $F_{PS}$: PS precoding matrix
- $F_{LAS}$: LAS precoder-a LAS selection matrix
- SPMT: single pole multiple throw
- PSs: Phase shifters

The conventional LAS-MIMO system design is shown in FIG. 2, where the analog part of the transceiver design consists of $N_L$ discrete lenses with P antenna elements connected to the focal surface of each lens. The total number of antenna elements under all lenses is equal M, placed in a way that the resultant antenna gain of the array is similar to half-wave spaced M antenna elements set in a ULA. The lenses array in connected to a PS network by single pole multiple throw (SPMT) switching network in between. One antenna element is activated under each lens by controlling the SMPT switching network to provide sub-beam with specific direction and low gain. As a result, one narrower beam with higher beamforming gain is produced for transmission from the combination of these sub-beams which is approximately equal to a beam generated from a half-wave spaced M antenna elements of ULA.

The analog precoder for the conventional LAS design is given as $$F = F_{LAS} F_{PS},$$

where $F_{PS}$ represents the PS precoders, and $F_{LAS}$ a LAS selection network that selects $N_L$ sub-beams to serve one RF path. In the case of massive MIMO without beam squinting, for a maximum array gain, the LAS precoder $F_{LAS}$ is designed in a way that the resultant precoder will match the steering vector of the channel. However, this can't be achieved while the beam squint effect exists in the system since the LAS selection is frequency-independent while the steering vector is frequency-dependent vector.

In order to solve the above-mentioned problem, the proposed design is presented in this work.

Figure 3:
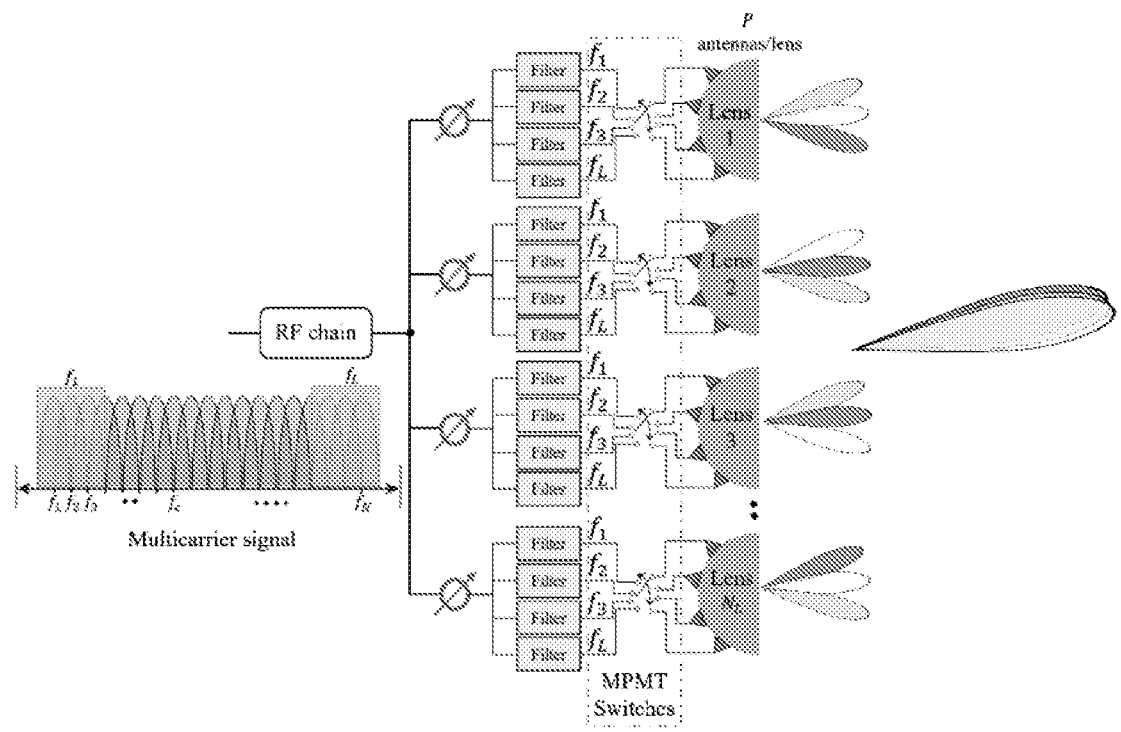
FIG. 3: The proposed LAS-MIMO system design
- RF: Radio frequency
- MPMT: multiple pole multiple throw
- LAS: Lens antenna subarray
- LAS-MIMO: Lens antenna subarray-multiple-input multiple-output

The proposed LAS design in an analog beamforming system for one RF path is given in FIG. 3. The design consists of $N_L$ PSs connect to L subband analog filters for each PS. The SPMT switching network is replaced with a multiple pole multiple throw (MPMT) switching network to connect the output of the L filters to L out of P antenna elements in each lens. Hence, each lens will provide L sub-beams at a time launched to different direction.

The main idea of the proposed design is to group the subcarrier frequencies into L subgroups where the bandwidth of these subgroups is much less than the total bandwidth of the signal. This can be done by using the subband analog filters. In the proposed design, we assume that the number of antenna elements under each lens P should be equal to or larger than the number of subgroups (P≥L) to increase the angular resolution of each lens. This ensures that each subgroup frequency benefits from the full beamforming gain by having $N_L$ sub-beams that generate one transmitted beam in the design. In this design, the analog precoder became frequency dependent and given as $$F = F'_{LAS}(k') F_{PS},$$

where $F'_{LAS}$ is the selection matrix for the proposed LAS design, k'=1, 2, ..., L. Conventionally, each column in the beam selection $S_t^{(i)}$ inside the selection matrix is one element activated (connected) while the other elements are zeros (disconnected). On the other hand, in the proposed LAS design, multiple antenna elements are activated within one column in the $S_t^{(i)}$ matrix.

The activated element is given as $$s_t^{(i)}(p) = \begin{cases} 1, & \min_p(|\Delta \phi|) \\ 0, & \text{otherwise} \end{cases},$$

where Δϕ is the main lobe angle difference between the ideal beam and the resultant beam from the proposed design. In order to find the optimum F design that minimize the Δϕ, an exhaustive search for all possible antenna selection is needed under all lenses. However, this produces computational complexity overhead to the LAS-MIMO system. Therefore, a simplified exhaustive search is applied to significantly reduce the complexity overhead where a specific threshold is put to stop the search when the Δϕ is less or equal to the threshold. In another word, the condition of activating the elements in $S_t^{(i)}$ is given as $$|\Delta\phi| \leq \zeta(k')$$

Where $\zeta(k')$ is the threshold which is a function of the subband filter indices. As the filter indices go far from the carrier frequency, the threshold increases linearly.

Figure 4:
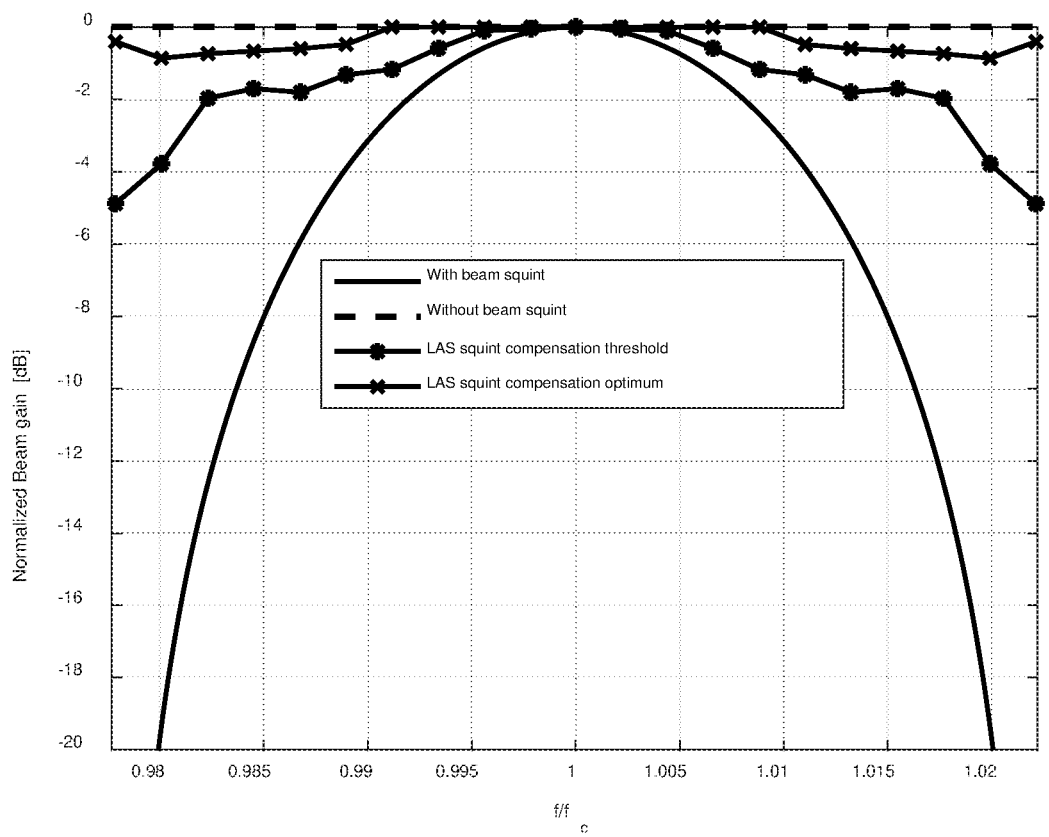
FIG. 4: Beam gain vs normalized frequency with respect to the carrier frequency in the proposed LAS design in a comparison to conventional massive MIMO system with beam squint effect.

As a result, the beam gain improves significantly with less complexity overhead added to the conventional LAS-MIMO system design. In order to prove the effectiveness of the proposed transceiver design, an example is done by assuming that we have a LAS with $N_L=4$, P=32, L=10, M=128, transmitting an orthogonal frequency division multiplexing (OFDM) signal [5] with an FFT size of 2048. With a carrier frequency of 60 GHz and 3 GHz signal bandwidth, if the transmission direction is π/4, the beam gain over all the subcarrier indices is illustrated in FIG. 4.

Within this document the term "Multiple Antenna System" refers to a communication system with antenna element more than one in its transceiver design to transmit/receive the electromagnetic wave signal, one common concept for multiple antenna system is the MIMO. These multiple antenna elements are placed in different topologies to control the electromagnetic wave signal and produce different beam shapes.

Within this document the term "Uniform linear array (ULA)" refers to the simplest multiple antenna topology where the antenna elements are placed in a linear line with equal distance to each other based on the operating/carrier frequency to shape a 2D beam.

Within this document the term "Lens antenna subarray (LAS)" refers to another multiple antenna topology where multiple discrete lenses are connected in a straight line with P antenna elements connected under each lens, M antenna elements in total. The total physical footprint of the lenses is approximately equal to the physical size of the half-wave spaced M antenna elements placed in ULA so that the ULA and LAS architectures exhibit similar antenna gains.

Within this document the term "Spatial-wideband effect" refers to the effect which happens in multiple antenna systems with a wideband transmission, where the last antenna element faces a large delay in data symbol compared to the first antenna element. This delay can be comparable to or larger than the symbol duration which reduces the system performance.

Within this document the term "Beam squint effect" refers to translation of the spatial-wideband effect from the time domain to the angle domain where the beam in the angle domain is shifted from its original direction.

Within this document the term "Precoding" refers to a generalization of beamforming to support multi-stream transmission in multi-antenna wireless networks. In conventional single-stream beamforming, the same signal is emitted from each of the transmit antennas with appropriate weighting (phase and gain) such that the signal power is maximized at the receiver output.

EXAMPLES

Example 1: Analysis of the Method According to Invention in Terms of Beam Gain

Assuming two communication/sensing nodes, sending and receiving nodes with LoS connection, the key system parameters are given as:

the system bandwidth B=3 GHZ,
carrier frequency fc=60 GHz,
$\hat{} = \pi/4$,
M=128,
the total number of subcarriers N=2048, and
the channel coefficient follows the complex Gaussian distribution CN (0, 1).

In FIG. 4, we present the beam gain vs normalized frequency where a comparison between the proposed LAS design with optimum and sub-optimum antenna selection, and the conventional massive MIMO system with and without beam squint is illustrated. The proposed LAS design has NL=4 and L=8 that divides the total signal bandwidth into 8 subbands with 256 sub-carriers in each band. The threshold function that is used here is given as $\zeta(k0)=|\eta(1-fk0/fc)\sin\hat{\theta}|$, where η is a constant value is chosen to be η=100.6 experimentally to get higher gain with faster evaluation. It is noticed from FIG. 4 that the proposed LAS design significantly enhances the beam gain of the subcarrier frequencies located away from fc. Hence, all subcarriers achieve maximum power gain at the receiver side. For example, the beam gain is improved by almost 15 dB for the worst subcarrier gain on the left and right of the carrier frequency compared to the squinted beam. In the conventional LAS design, as the number of lenses increases within the same total amount of antenna elements, the system performance improves until some level, However, in the proposed design, increasing the number of lenses in the system with fixed M limits the level of controlling the beam squint effect since the number of antenna elements under each lens is decreased with a fixed number of analog subband filters, and hence it reduces the design capability.

Around these basic concepts, it is possible to develop several embodiments regarding the subject matter of the invention; therefore the invention cannot be limited to the examples disclosed herein, and the invention is essentially as defined in the claims.

It is obvious that a person skilled in the art can convey the novelty of the invention using similar embodiments and/or that such embodiments can be applied to other fields similar to those used in the related art. Therefore it is also obvious that these kinds of embodiments are void of the novelty criteria and the criteria of exceeding the known state of the art.

INDUSTRIAL APPLICATION OF THE INVENTION

Present invention is directed to a novel transceiver design method to control and/or compensate for the spatial wideband effect in wideband massive multiple-input multiple-output (MIMO) systems for both sensing and communication networks.

In that sense, the method of the invention is applicable to any wireless sensing and/or communication networks with MIMO technology. The transceiver design method of the invention provides energy and spectrum efficient systems with less hardware complexity compared to conventional massive MIMO systems.

Standards like 3GPP-based cellular and IEEE 802.11 based Wi-Fi networks, or any wireless network are particularly relevant to the invention due to the support of multiple antenna technology provided in both standards.

Furthermore, the described method in this invention can be implemented on any device, system or network capable of supporting any of the aforementioned standards, for instance: Long Term Evolution (LTE), LTE-advanced, AMPS, 5G New Radio (NR).

The invention claimed is:
1. A transceiver for use in massive MIMO systems for sensing and/or communication networks wherein; said transceiver comprises a conventional LAS design for a massive MIMO system where NL phase shifters (PSs) connect to L subband analog filters for each phase shifter (PS) and a multiple pole multiple throw (MPMT) switching network to connect the output of the L filters to L out of P antenna elements in each lens instead of using SPMT switching in the conventional LAS design.

2. A method to build and control a transceiver using the following steps:
designing a conventional LAS massive MIMO system;
adding L analog subband filters to each lens after the phase shifter component to divide the ultra-wideband signal into chunks of narrowband signals;
replacing an SPMT switching network in the conventional LAS design with a MPMT switching network to connect the output of the L analog subband filters to L out of P antenna elements on each lens;
providing a conventional exhaustive search for a precoding design to control a proposed transceiver design; and
adding a certain linear threshold is to the exhaustive search to perform faster and to reduce a complexity overhead of the conventional exhaustive search on the precoding design and present a simplified exhaustive search-based precoder.

3. The method of claim 2, wherein the step for dividing ultra-wideband signals into chunks of narrowband signals comprises the steps of;

assuming that the number of antenna elements under each lens P should be equal to or larger than a number of subgroups (P≥L) to increase an angular resolution of each lens;
using a frequency dependent analog precoder given as;

$$F = F'_{LAS}(k')F_{PS},$$

where $F'_{LAS}$ is the selection matrix for the proposed LAS design, k'=1, 2, ..., L;
activating multiple antenna elements within one column in the 5 matrix, wherein the $s_t^{(i)}$ activating element is;

$$s_t^{(i)}(p) = \begin{cases} 1, & \frac{\min(|\Delta\phi|)}{p} \\ 0, & \text{otherwise} \end{cases},$$

where $\Delta\phi$ is a main lobe angle difference between an ideal beam and a squinting beam; and
applying a simplified $s_t^{(i)}$ exhaustive search to reduce the complexity overhead where a specific threshold is put to stop the search when the $\Delta\phi$ is less or equal to the threshold, herein the condition of activating the elements in is given as $$|\Delta\phi| \leq \zeta(k')$$

where $\zeta(k')$ is the threshold which is a function of subband filter indices.

* * * * *